(12) United States Patent
Nakatsuka et al.

(10) Patent No.: US 9,764,738 B2
(45) Date of Patent: Sep. 19, 2017

(54) VEHICLE CONTROL APPARATUS

(71) Applicant: HONDA MOTOR CO., LTD., Tokyo (JP)

(72) Inventors: Masayuki Nakatsuka, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/331,061

(22) Filed: Oct. 21, 2016

(65) Prior Publication Data

US 2017/0113694 A1 Apr. 27, 2017

(30) Foreign Application Priority Data

Oct. 23, 2015 (JP) ................................. 2015-209053

(51) Int. Cl.
| | | |
|---|---|---|
| *A01B 69/00* | (2006.01) | |
| *B60W 30/18* | (2012.01) | |
| *B60W 10/20* | (2006.01) | |
| *B60W 10/184* | (2012.01) | |
| *B60W 30/095* | (2012.01) | |
| *B60W 50/12* | (2012.01) | |
| *G08G 1/00* | (2006.01) | |

(52) U.S. Cl.
CPC .... *B60W 30/18109* (2013.01); *B60W 10/184* (2013.01); *B60W 10/20* (2013.01); *B60W 30/0956* (2013.01); *B60W 50/12* (2013.01); *G08G 1/207* (2013.01); *B60W 2420/42* (2013.01); *B60W 2420/52* (2013.01); *B60W 2540/26* (2013.01); *B60W 2550/14* (2013.01); *B60W 2710/18* (2013.01); *B60W 2720/24* (2013.01)

(58) Field of Classification Search
CPC ......... B60W 30/18109; B60W 10/184; B60W 10/20
See application file for complete search history.

(56) References Cited

U.S. PATENT DOCUMENTS

| | | | | |
|---|---|---|---|---|
| 6,237,504 B1 * | 5/2001 | Tanahashi | .............. | B62D 1/265 104/243 |
| 2011/0282549 A1 * | 11/2011 | Choi | ................... | B60T 8/17557 701/41 |

FOREIGN PATENT DOCUMENTS

| | | |
|---|---|---|
| JP | 2003-118424 A | 4/2003 |
| JP | 2014-201217 A | 10/2014 |

* cited by examiner

*Primary Examiner* — Adam Alharbi
(74) *Attorney, Agent, or Firm* — Westerman, Hattori, Daniels & Adrian, LLP

(57) ABSTRACT

A road-condition determining unit determines the condition of a travelling road on which a vehicle is travelling. When a predetermined condition is satisfied, a stopping controller operates a braking mechanism to perform an automatic stop process of stopping the vehicle, and uses a steering mechanism to change the orientation of steered wheels of the vehicle in accordance with the condition of the travelling road which is determined by the road-condition determining unit when the automatic stop process is to end.

14 Claims, 12 Drawing Sheets

VEHICLE CONTROL APPARATUS

CROSS REFERENCES TO RELATED APPLICATIONS

The present application claims priority under 35 U.S.C. §119 to Japanese Patent Application No. 2015-209053, filed Oct. 23, 2015, entitled "VEHICLE CONTROL APPARATUS." The contents of this application are incorporated herein by reference in their entirety.

TECHNICAL FIELD

The present disclosure relates to a vehicle control apparatus that exerts control to maintain stopping of a vehicle.

BACKGROUND

In the related art, a vehicle stop control apparatus has been proposed in which, when a vehicle in which each of the wheels is capable of being; independently steered is stopped, one or more wheels are steered to the toe-in side or the toe-out side, whereby friction force exerted between the steered wheels and the road surface prevents the vehicle from moving forward or backward (for example, see Japanese Unexamined Patent Application Publication No. 2014-201217).

In addition, a travelling control apparatus has been proposed in which, when decrease in alertness of a driver is detected, the vehicle is stopped after making a lane change to the leftmost lane (for example, see Japanese Unexamined Patent Application Publication No. 2003-118424).

By using the vehicle stop control apparatus described in Japanese Unexamined Patent Application Publication No. 2014-201217, when only one wheel is steered to the toe-in side or the toe-out side, an insufficient friction force exerted between the wheel and the road may cause the vehicle to move. To steer two or more wheels to the toe-in side or the toe-out side, a configuration needs to be employed in which a set of wheels is capable of being independently steered, which disadvantageous makes the configuration of the vehicle complicated.

In addition, no consideration to the orientation of wheels during stopping of the vehicle is given to the travelling control apparatus described in Japanese Unexamined Patent Application Publication No. 2003-118424.

SUMMARY

It is desirable, for example, to provide a vehicle control apparatus that is capable of keeping a vehicle in a stopping state, without using a complicated configuration.

According to a first aspect of the present disclosure, there is provided a vehicle control apparatus controlling an operation of a vehicle provided with a steering unit and a braking unit. The, steering unit changes an orientation of a steered wheel. The braking unit brakes a wheel. The apparatus includes a road-condition determining unit and a stopping controller. The road-condition determining unit determines a condition of a travelling road on which the vehicle is travelling. When a predetermined condition is satisfied, the stopping controller performs an automatic stop process of operating the braking unit to stop the vehicle. The stopping controller causes the steering unit to change the orientation of the steered wheel of the vehicle in accordance with the condition of the travelling road. The condition of the travelling road is determined by the road-condition determining unit. The changed orientation is maintained when the automatic stop process ends.

According to the first aspect, in the automatic stop process performed to stop the vehicle, the stopping controller causes the steering unit to change the orientation of the steered wheel of the vehicle in accordance with the condition of the travelling road when the automatic stop process is to end. Thus, by using the condition of the travelling road, a state in which the vehicle moves due to its own weight or the like may be prevented without employing a complicated configuration.

When the road-condition determining unit determines that the travelling road is a downhill road on which a curb is present along a road, edge, the stopping controller may end the automatic stop process in a state in which the steered wheel of the vehicle is oriented toward the curb. When the road-condition determining unit determines that the travelling road is an uphill road on which a curb is present along a road edge, the stopping controller may end the automatic stop process in a state in which the steered wheel of the vehicle is oriented away from the curb.

According to this configuration, a state in which the gradient of the travelling road causes the vehicle to move due to its own weight may be prevented by using the steered wheel in contact with the curb.

When the road-condition determining unit determines that the travelling road is a downhill road on which an object is present on a median strip, the stopping controller may end the automatic stop process in a state in which the steered wheel of the vehicle is oriented toward the object. When the road-condition determining unit determines that the travelling road is an uphill road on which an object is present on a median strip, the stopping controller may end the automatic stop process in a state in which the steered wheel of the vehicle is oriented away from the object.

According to this configuration, a stats in which the gradient of the travelling road causes the vehicle to move due to its own weight may be prevented, by using the steered, wheel in contact with the object.

In the automatic stop process, when the road-condition determining unit determines that the travelling road is a road on which a curb is present along a road edge and on which a first object is present on a median strip, the stopping controller may cause the vehicle to be pulled over to a closer object chosen from among the curb and the first object, the closer object being closer to the vehicle, and may cause the vehicle to stop. When the road-condition determining unit determines that the travelling road is a downhill road, the stopping controller may end the automatic stop process in a state in which the steered wheel of the vehicle is oriented toward the closer object. When the road-condition determining unit determines that the travelling road is an uphill road, the stopping controller may end the automatic stop process in a state in which the steered wheel of the vehicle is oriented away from the closer object. The closer object is an object to which the vehicle is pulled over. The closer object is chosen from among the curb and the first object.

According to this configuration, when the travelling road is a road on which a curb is present along a road edge and on which a first object is present on the median strip, the vehicle may be quickly pulled over to an object that is closer to: the: vehicle and that is chosen from among the curb and the first object, and may be kept in a stopping state.

The vehicle control apparatus may further include a nearby-vehicle determining unit that determines a condition about another vehicle which is present around the vehicle.

When the predetermined condition is, satisfied, if the road-condition determining unit determines that the travelling road having two lanes or more on each side is a road on which a curb is present along a road edge and on which an object is present on a median strip, and if the road-condition determining unit also determines that the vehicle is travelling in a lane closest to the median strip, the stopping controller may determine whether or not a condition in which a lane change is allowed to be made without coming into contact with the other vehicle is satisfied on the basis of the condition about the other vehicle which is present nearby. The condition about the other vehicle is determined by the nearby-vehicle determining unit. The lane change is a lane change to a lane along which the curb is present. If the condition in which the lane change is allowed to be made is satisfied, the stopping controller may cause the lane change to be made and then may cause the vehicle to stop. If the condition in which the lane change is allowed to be made is not satisfied, in a predetermined time, the; stopping controller may not cause the lane change to be made, and may cause the vehicle to stop in a lane closest to the median strip.

According to this configuration, in the case where the travelling road has multiple lanes, and where the vehicle is travelling on a lane closest to the median strip, when the condition in which a lane change may be made is satisfied in a predetermined time, a lane change to the lane along which the curb is present is made, whereby the vehicle may be stopped in a safer state.

When the automatic stop process is performed to stop the vehicle in an available stopping area which is an area other than the travelling road, the stopping controller may end the automatic stop process in a state in which the steered wheel of the vehicle is oriented away from a center area of the travelling road.

According to this configuration, when the vehicle is to be stopped in an available stopping area in which a vehicle may be stopped and which is an area other than the travelling road, the vehicle may be prevented from moving from the available stopping area to the road.

When the road-condition determining unit determines that a to-be-avoided area is present alongside the travelling road, the stopping controller may end the automatic stop process in a state in which the steered wheel of the vehicle is oriented, away from the to-be-avoided area.

According to this configuration, the vehicle may be prevented from moving to the to-be-avoided area (such as a cliff or a gutter) which is present alongside the travelling road.

The road-condition determining unit may determine the condition of the travelling road on the basis of at least one of a recognition result and a checking result. The recognition result is obtained by an external recognition sensor provided for the vehicle. The checking result is obtained by checking map information against a current position of the vehicle.

According to this configuration, by using the external recognition sensor (such as a camera or a radar) provided for the vehicle, or by using a checking result obtained by checking the map information for navigation which is provided for the vehicle against the current position of the vehicle, the road-condition determining unit may be configured.

According to a second aspect of the present disclosure, there is provided a vehicle control apparatus controlling an operation of a vehicle provided with a steering unit and a braking unit. The steering unit changes an orientation of a steered wheel. The braking unit brakes a wheel. The apparatus includes a road-condition determining unit and a stopping controller. The road-condition determining unit determines a condition of a travelling road on which the vehicle is travelling. When a predetermined condition is satisfied, the stopping controller performs an automatic stop process of causing the steering unit and the braking unit to stop the vehicle parallel to the travelling road, and then causing the steering unit to orient the steered wheel of the vehicle in a direction nonparallel to a forward direction of the travelling road in accordance with the condition of the travelling road. The condition of the travelling road is determined by the road-condition determining unit.

According to the second aspect, after the vehicle is stopped parallel to the travelling road, the steering unit is used to orient the steered wheel of the vehicle in a direction nonparallel to the forward direction of the travelling road in accordance with the condition of the travelling road which is determined by the road-condition determining unit, whereby the vehicle may be prevented from moving.

According to a third aspect of the present disclosure, there is provided a vehicle control apparatus controlling an operation of a vehicle provided with a steering unit that changes an orientation of a steered wheel. The apparatus includes a road-condition determining unit and a stopping controller. The road-condition determining unit determines a condition of a currently-vehicle-located road which is a road on which the vehicle is located. When the vehicle stops, if the road-condition determining unit determines that the currently-vehicle-located road is a road on which a curb is present along a road edge and which has a gradient, the stopping controller performs an upon-stopping steering-direction changing process of changing the orientation of the steered wheel of the vehicle in accordance with the gradient of the currently-vehicle-located road.

According to the third aspect, when the vehicle is stopped on a road which has a gradient and on which a curb is present along a road edge, the orientation of the steered wheel of the vehicle is changed in accordance with the gradient of the travelling road, whereby the gradient may be prevented from causing the vehicle to move due to its own weight.

The vehicle control apparatus may further include a vehicle-position determining unit that determines a region in which the vehicle is located. When the vehicle-position determining unit determines that the vehicle is located in a specific area, the stopping controller may perform the upon-stopping steering-direction changing process.

According to this configuration, when the vehicle is to stop in the specific area in which the orientation of the steered wheel during stopping of the vehicle is regulated, change of the orientation of the steered wheel according to the regulation may be assisted.

BRIEF DESCRIPTION OF THE DRAWINGS

The advantages of the disclosure will become apparent in the following description taken in conjunction with the following drawings.

DETAILED DESCRIPTION

Embodiments of the present disclosure will be described with reference to FIGS. 1 to 11.

Figure 1:
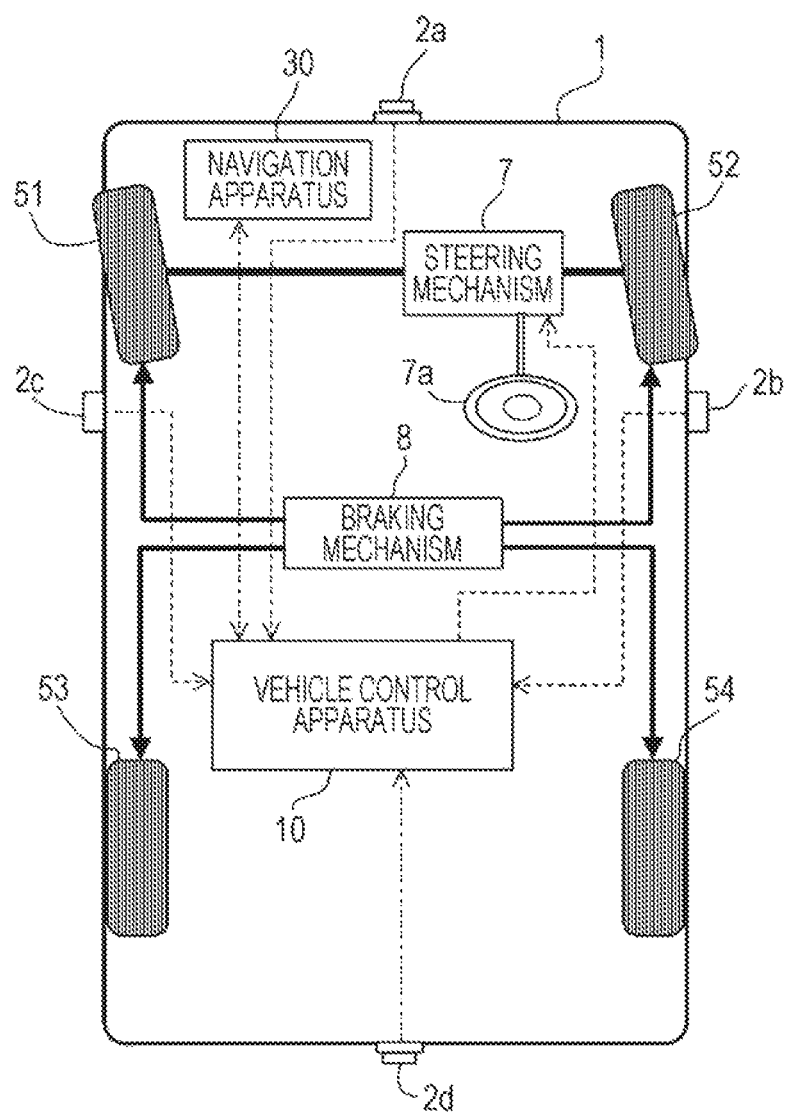
FIG. 1 is a diagram illustrating the configuration of a vehicle in which one embodiment of a vehicle control apparatus is mounted.

Referring to FIG. 1, a vehicle control apparatus 10 according to an embodiment of the present disclosure is mounted in a vehicle 1 provided with a front camera 2a, a right side camera 2b, a left side camera 2c, and a rear camera 2d (the cameras 2a to 2d are hereinafter collectively called cameras 2, and correspond to an external recognition sensor provided in the present disclosure), a steering mechanism 7 (which corresponds to a steering unit provided in the present disclosure) including a steering 7a, a braking mechanism 3 (which corresponds to a braking unit-provided in the present disclosure), a navigation apparatus 30, and the like.

The steering mechanism 7 changes the orientation of front wheels (steered wheels) 51 and 52 among wheels 51 to 54 of the vehicle 1. The braking mechanism 8 controls rotation of the wheels 51 to 54 to decelerate the vehicle 1. The vehicle control apparatus 10 controls the entire operations of the vehicle 1.

Figure 2:
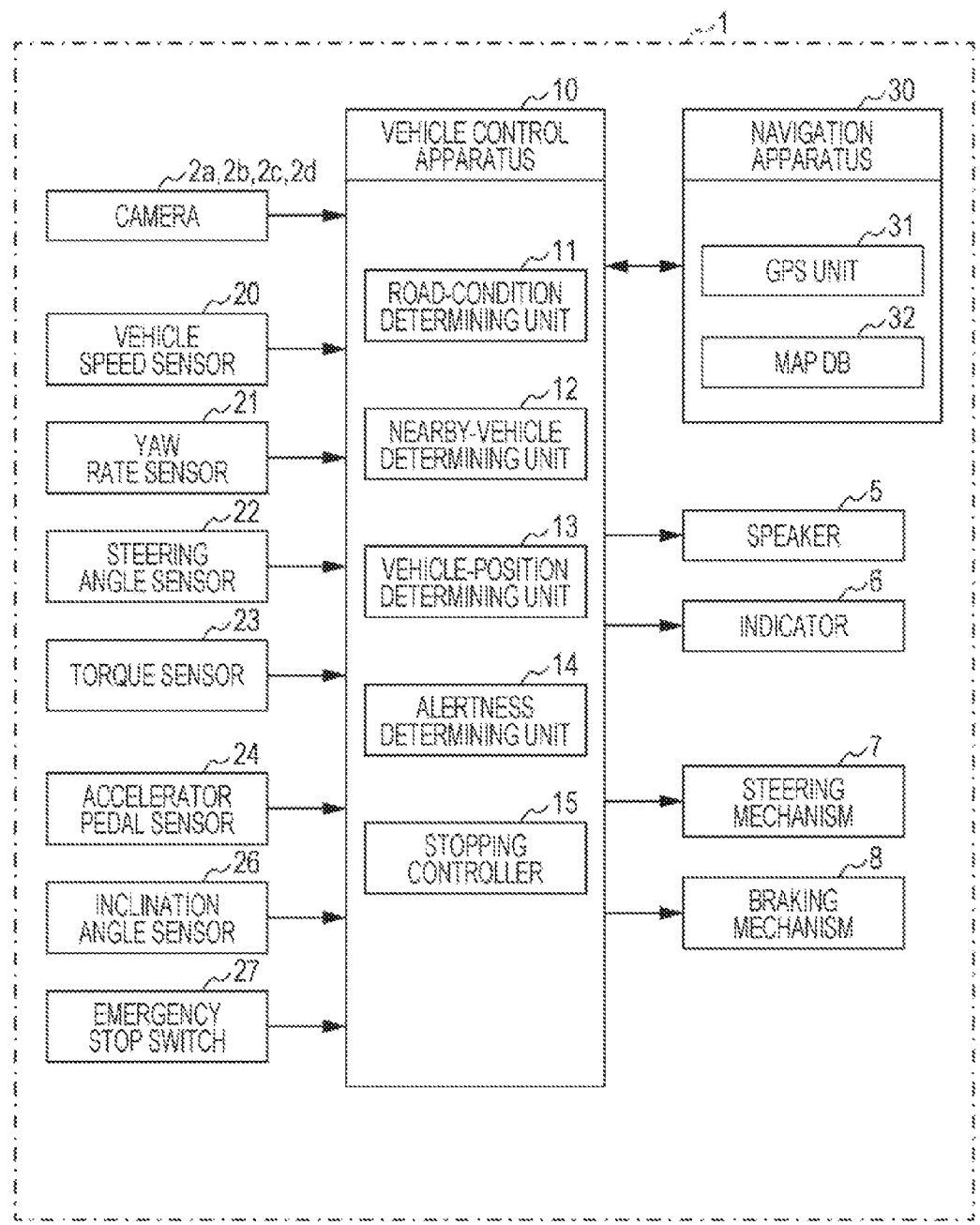
FIG. 2 is a diagram illustrating the configuration of the vehicle control apparatus.

Referring to FIG. 2, the vehicle control apparatus 10 which is an electronic circuit unit constituted by a central processing unit (CPU), a memory, an interface circuit, and the like (not illustrated) uses the CPU to execute programs that are used to control the vehicle 1 and that are stored in the memory, thereby functioning as a road-condition determining unit 11, a nearby-vehicle determining unit. 12, a vehicle-position determining unit 13, an alertness determining unit 14, and a stopping controller 15. These function may be embodied by hardware such as circuitry.

The vehicle control apparatus 10 receives images of the surroundings of the vehicle 1 which are captured by the cameras 2. In addition, the vehicle control apparatus 10 receives detection signals from a vehicle speed sensor 20, a yaw rate sensor 21, a steering angle sensor 22 (which detects the steering angle of the steered wheels 51 and 52), a torque sensor 23 (which detects an operating torque applied to the steering 7a), an accelerator pedal sensor 24 (which detects the operational condition of an accelerator pedal which is not illustrated), and an inclination angle sensor 26 (which detects the inclination angle of the road on which the vehicle 1 is traveling) which are provided for the vehicle 1, and an operation signal from an emergency stop switch 27 (a switch for instructing the vehicle 1 to make an emergency stop).

Control signals which are output from the vehicle control apparatus 10 are used to control operations of a speaker 5, an indicator 6, the steering mechanism 7, the braking mechanism 3, and the navigation apparatus 30. The navigation apparatus 30 which is provided with a global positioning system (GPS) unit 31 detecting the current position of the vehicle 1 and which is also provided with a map database 32 storing map data provides route guidance to a destination, The road-condition determining unit 11 determines conditions of a road (travelling road) on which the vehicle 1 is travelling, on the basis of the images of the surroundings of the vehicle 1 which are captured by using the cameras 2, the current position which is the position of the vehicle 1 on the map and which is determined by the navigation apparatus 30 (the current position on the map is determined from the result obtained by checking the current position of the vehicle 1 against the map information), and the inclination of the road which is detected by the inclination angle sensor 26, and the like. A configuration may be employed in which the road-condition determining unit 11 determines the conditions of the road on the basis of either one or all of a set of the images of the surroundings of the vehicle 1 which are captured by the cameras 2 and the current position of the vehicle 1 on the map which is determined by the navigation apparatus 30.

The nearby-vehicle determining unit 12 determines nearby vehicles which are present around the vehicle 1, on the basis of images of the surroundings of the vehicle 1 which are captured by using the cameras 2. The vehicle-position determining unit 13 determines a lane on which the vehicle 1 is travelling, on the basis of images of the surroundings of the vehicle 1 which are captured by using the cameras 2 and the current position of the vehicle 1 on the map which is determined by the navigation apparatus 30. The alertness determining unit 14 detects the condition of driving operations performed by the driver, on the basis of detection signals from the torque sensor 23 and the accelerator pedal sensor 24. When a condition in which driving operations have not been performed has been continued for a predetermined time or more, the alertness determining unit 14 determines that the alertness of the driver has decreased.

When an emergency stop condition (which corresponds to a predetermined condition provided in the present disclosure) is satisfied while the vehicle 1 is travelling, the stopping controller 15 operates the steering mechanism 7 and the braking mechanism 8 to perform an automatic stop process of stopping the vehicle 1. In the present embodiment, a case in which the emergency stop switch 27 is operated and a case in which the alertness determining unit 14 determines that the alertness of the driver has decreased are set as the predetermined condition.

First Embodiment

Referring to FIGS. 3 to 9, an automatic stop process performed by the stopping controller 15 will be described.

Figure 3:
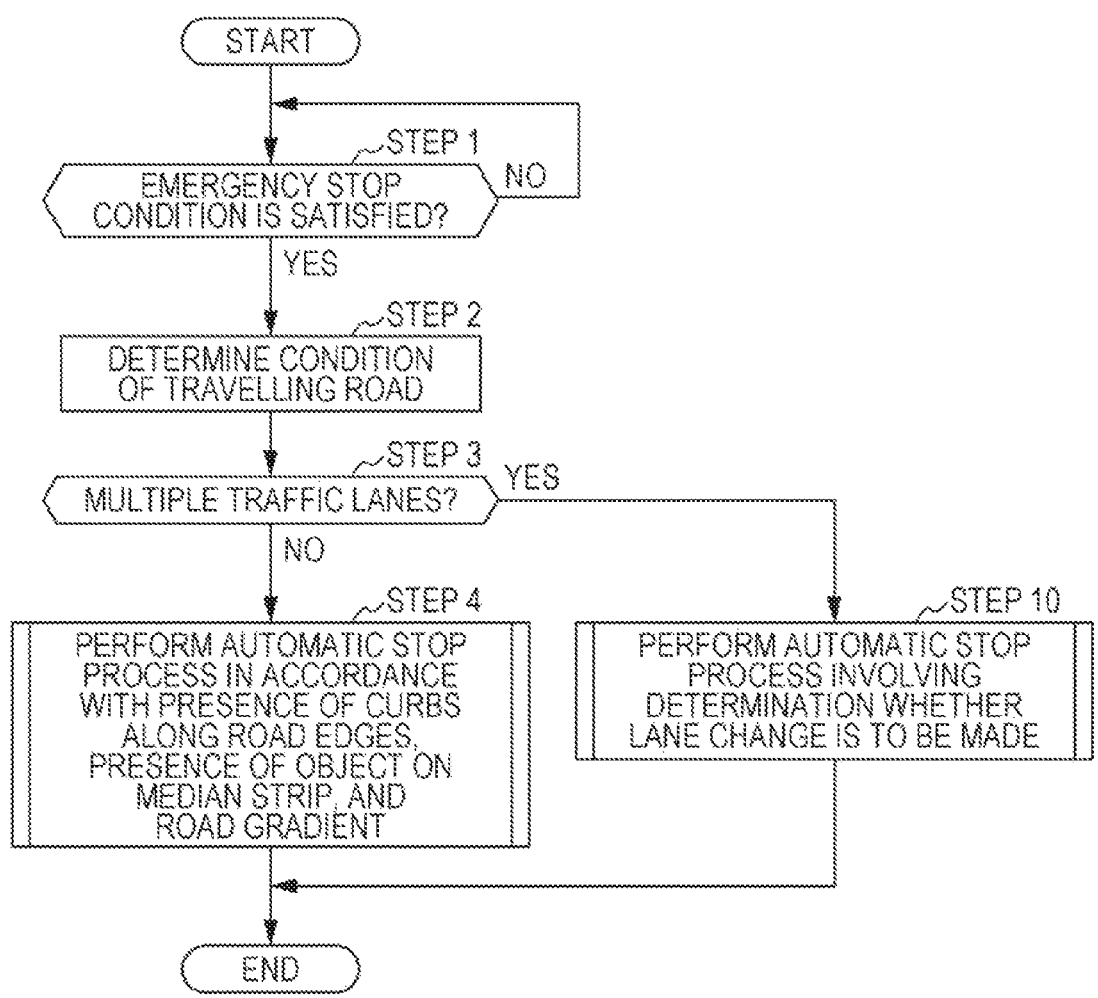
FIG. 3 is a flowchart of operations performed by one embodiment of a stopping controller.

The stopping controller 15 performs a process according to the flowchart illustrated in FIG. 3. In STEP 1, if the emergency stop condition is satisfied, the process proceeds to STEP 2 in which an automatic stop process is started. In STEP 2, the stopping controller 15 determines the number of traffic lanes, the presence/absence of curbs along the road edges, the presence/absence of an object on the median strip, and the gradient of the road (an uphill gradient or a downhill gradient) as the conditions of the road (travelling road) on which the vehicle 1 is travelling, on the basis of the determination results obtained by the road-condition determining unit 11.

In STEP 3 which is the next step, the stopping controller 15 determines whether or not multiple traffic lanes are present. If multiple traffic lanes are present, the process branches to STEP 10. If multiple traffic lanes are not present (one lane on each side), the process proceeds to STEP 4, In STEP 4, the stopping controller 15 performs an automatic stop process in accordance with the presence/absence of curbs along the road edges, the presence/absence of an object on the median strip, and the gradient of the road. Referring to FIGS. 4 to 8, an automatic stop process which does not involve a lane change will be described below.

Figure 4:
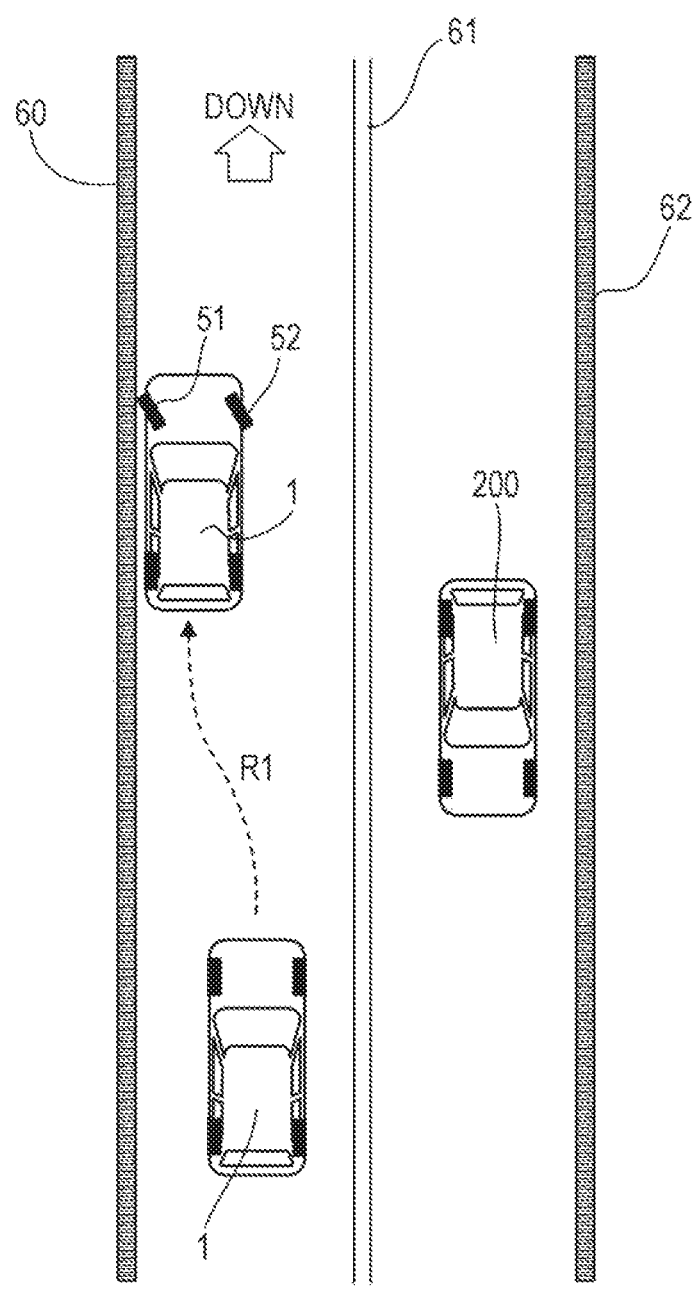
FIG. 4 is a diagram for describing an automatic stop process for a downhill road on which curbs are present along the road edges.

1-1. In the Case of Presence of Curbs, Absence of Object on Median Strip, and Downhill Gradient An automatic stop process performed, when the road on which the vehicle 1 (host vehicle) is travelling is determined, as illustrated in FIG. 4, to be a downhill road on which curbs 60 and 62 are installed along the road edges and on which an object is not installed on a median strip 61 will be described. An oncoming vehicle 200 is present.

As illustrated by using R1, the stopping controller 15 operates the steering mechanism 7 and the braking mechanism 8 so that the vehicle 1 is decelerated, is pulled over to the curb 60 and stopped. Then, the stopping controller 15 operates the steering mechanism 7 so that the steered wheels 51 and 52 are oriented toward the curb 60, and ends the automatic stop process. Thus, the steered wheels 51 and 52 are oriented toward the curb 60, whereby the steered wheel 51 in contact with the curb 60 may prevent the vehicle 1 from moving forward due to its own weight.

Figure 5:
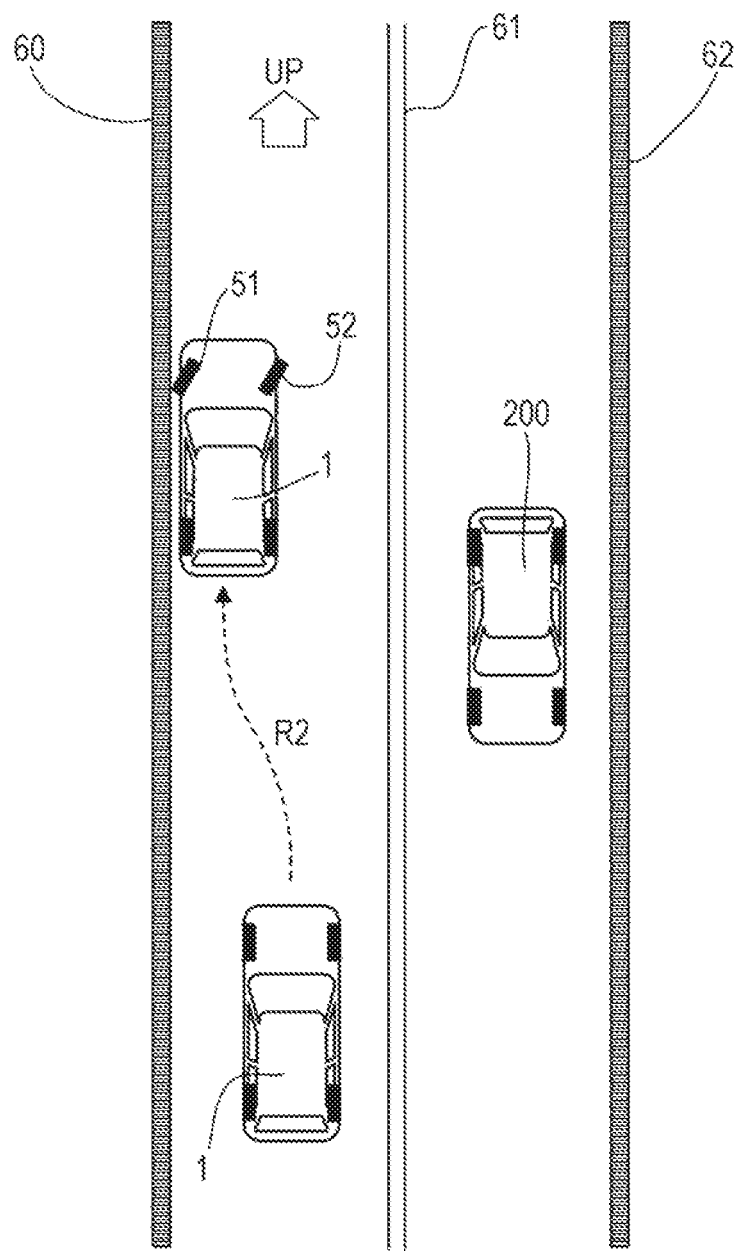
FIG. 5 is a diagram for describing an automatic stop process for an uphill road on which curbs are present along the road edges.

1-2. In the Case of Presence of Curbs, Absence of Object on Median Strip, and Uphill Gradient An automatic stop process performed when the road on which the vehicle 1 is travelling is determined, as illustrated in FIG. 5, to be an uphill road on which the curbs 60 and are installed along the road edges and on which an object is not installed on the median strip 61 will be described.

As illustrated by using R2, the stopping controller 15 operates the steering mechanism 7 and the braking mechanism 8 so that the vehicle 1 is decelerated, is pulled over to the curb 60 and stopped. Then, the stopping controller 15 operates the steering mechanism 7 so that the steered wheels 51 and 52 are oriented away from the curb 60, and ends the automatic stop process. Thus, the steered wheels 51 and 52 are oriented away from the curb 60, whereby the steered wheel 51 in contact with the curb 60 may prevent the vehicle 1 from moving backward due to its own weight.

Figure 6:
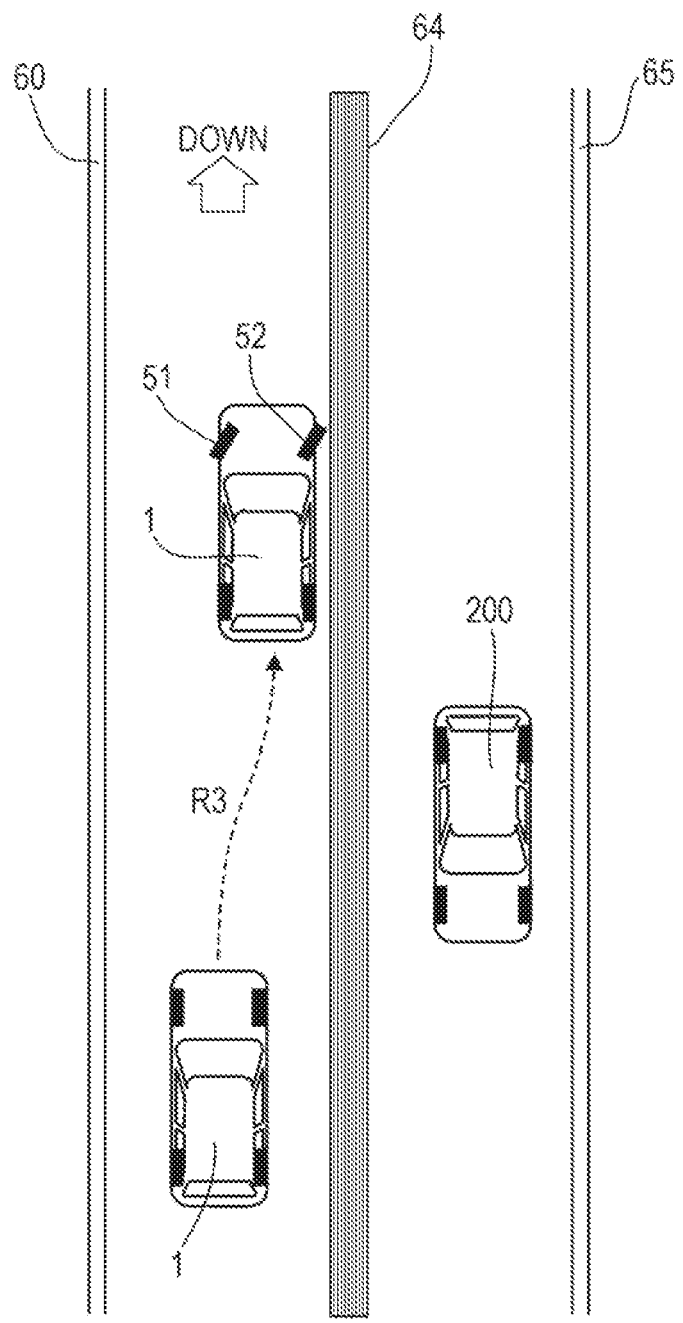
FIG. 6 is a diagram for describing an automatic stop process for a downhill road on which an object is present on the median strip.

1-3. In the Case of Absence of Curbs, Presence of Object on Median Strip, and Downhill Gradient An automatic stop process performed when the road on which the vehicle 1 is travelling is determined, as illustrated in FIG. 6, to be a downhill road on which no curbs are installed along road edges 63 and 65 and on which an object 64 is installed on the median strip will be described.

As illustrated by using R3, the stopping controller 15 operates the steering mechanism 7 and the braking mechanism 8 so that the vehicle 1 is decelerated, is pulled over to the object 64 and stopped. Then, the stopping controller 15 operates the steering mechanism 7 so that the steered wheels 51 and 52 are oriented toward the object 64, and ends the automatic stop process. Thus, the steered wheels 51 and 52 are oriented toward the object 64, whereby the steered wheel 52 in contact with the object 64 may prevent the vehicle 1 from moving forward due to its own weight.

Figure 7:
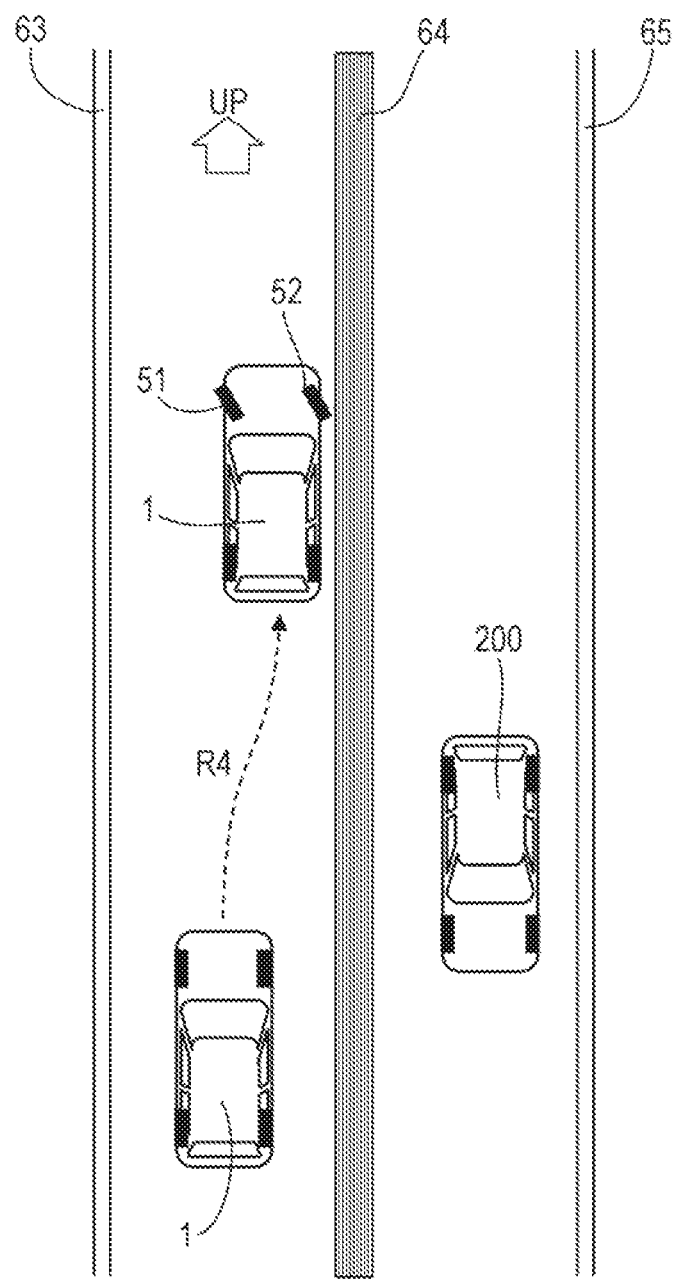
FIG. 7 is a diagram for describing an automatic stop process for an uphill road on which an object is present on the median strip.

1-4. In the Case of Absence of Curbs, Presence of Object on Median Strip, and Uphill Gradient An automatic stop process performed when the road on which the vehicle 1 is travelling is determined, as illustrated in FIG. 7, to be an uphill road on which no curbs are installed along the road edges 63 and 65 and on which the object 64 is installed on the median strip will be described.

As illustrated by using R4, the stopping controller 15 operates the steering mechanism 7 and the braking mechanism 8 so that the vehicle 1 is decelerated, pulled over to the object 64, and stopped. Then, the stopping controller 15 operates the steering mechanism 7 so that the steered wheels 51 and 52 are oriented away from the object 64, and ends the automatic stop process. Thus, the steered wheels 51 and 52 are oriented away front the object 64, whereby the steered wheel 52 in contact with the object 64 may prevent the vehicle 1 from moving backward doe to its own weight.

1-5. In the Case where Presence of Curb and Presence of Object on Median Strip

Figure 8:
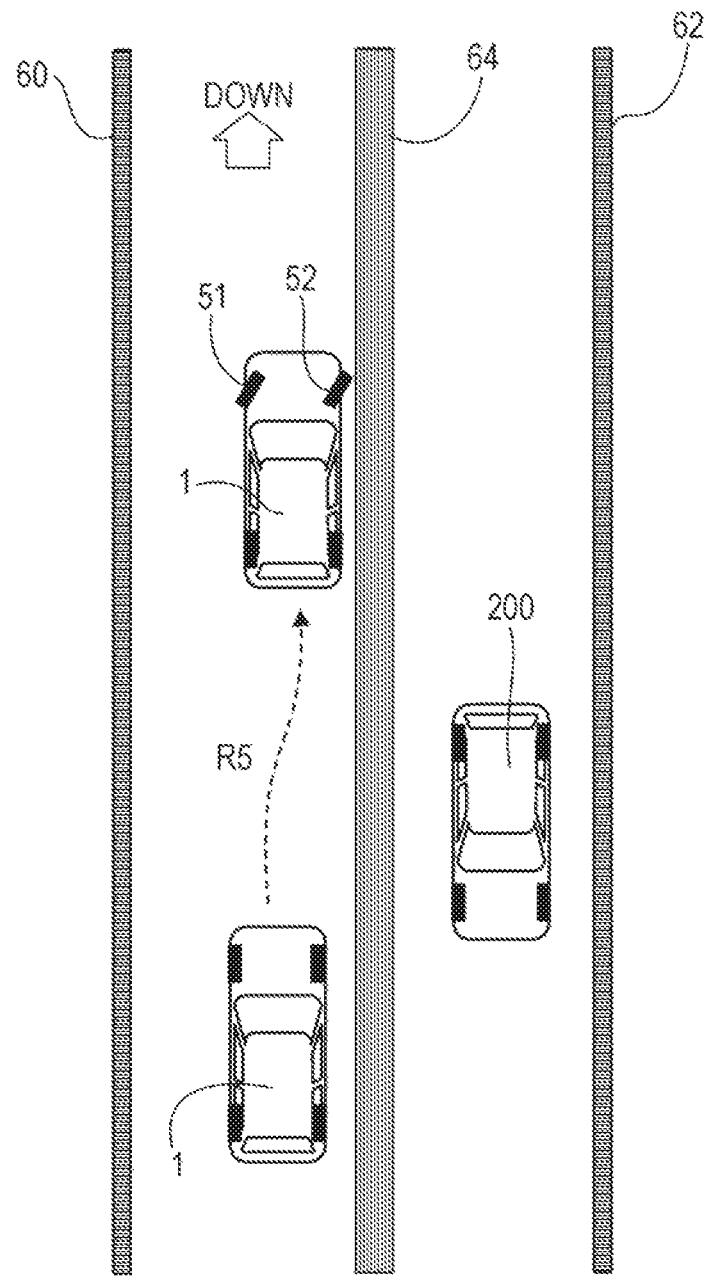
FIG. 8 is a diagram for describing an automatic stop process for a downhill road on which curbs are present along the road edges and on which an object is present on the median strip.

An automatic stop process performed when the road on which the vehicle 1 is travelling is determined, as illustrated in FIG. 8, to be a road on which the curbs 60 and 62 are installed along the road edges and on which the object 64 is installed on the median strip will be described.

The stopping controller 15 determines which, the curb 60 or the object 64, is closer to the vehicle 1, on the basis of the determination result obtained by the vehicle-position determining unit 13. The stopping controller 15 causes the vehicle 1 to be pulled over to the closer object, the curb 60 or the object 64, and causes the vehicle 1 to stop. Similarly to the cases in FIGS. 4 to 7, the stopping controller 15 causes the orientation of the steered wheels 51 and 52 to be changed in accordance with the gradient of the road, and ends the automatic stop process.

In the example in FIG. 8, since the object 64 is closer to the vehicle 1 than the curb 60, as illustrated by using R5, the stopping controller 15 causes the vehicle 1 to be pulled over to the object 64 and be stopped. Since the road is a downhill road, the stopping controller 15 causes the steered wheels 51 and 52 to be oriented, toward the object 64, and ends the automatic stop process.

Figure 9:
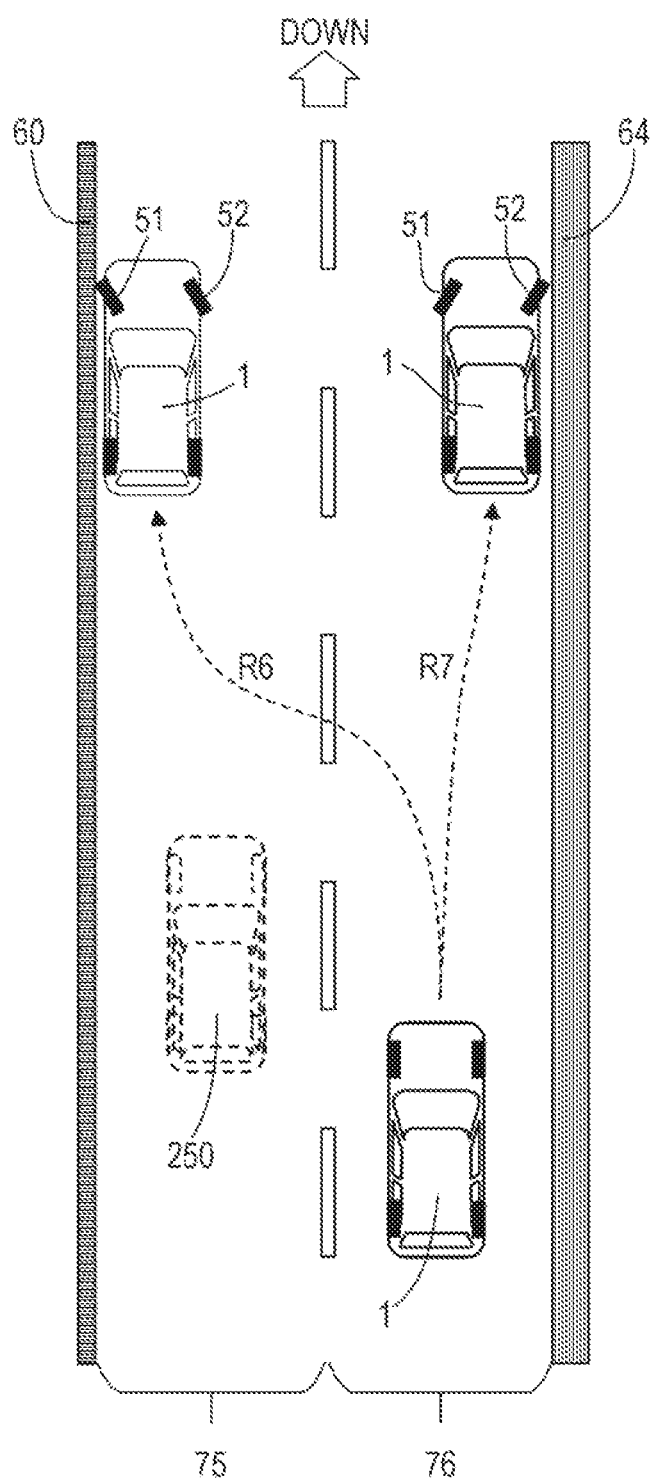
FIG. 9 is a diagram for describing an automatic stop process for a road having two lanes on each side.

1-6. In the Case of Presence of Curbs, Presence of Object on Median Strip, and Two Lanes on Each Side An automatic stop process performed in STEP 10 will be described. In STEP 10, an automatic stop process performed when the road is determined, as illustrated in FIG. 9, to be a road which has two lanes or more (two lanes in FIG. 9), on which the curb 60 is present, along a road edge, and on which the object 64 is installed on the median strip is performed.

In the case where the stopping controller 15 determines that the vehicle 1 is travelling on a road having two lanes on each side, on the basis of the determination results obtained by the road-condition determining unit 11, and where the stopping controller 15 determines that the vehicle 1 is travelling on a lane 76 on the median strip side, on the basis of the determination result obtained by the vehicle-position determining unit 13, the stopping controller 15 determines whether or not a lane change to a lane 75 on the curb side is allowed to be made.

Specifically, the stopping controller 15 determines whether or not a nearby vehicle is present around the vehicle 1, on the basis of the determination result obtained by the nearby-vehicle determining unit 12. If no nearby vehicles which prevent a lane change are present, as illustrated by using R6, the stopping controller 15 causes a lane change to the lane 75 on the curb 60 side to be made, and causes the vehicle 1 to be pulled over to the curb 60 and be stopped. Similarly to the examples in FIGS. 4 and 5, the stopping controller 15 causes the orientation of the steered wheels 51 and 52 to be changed in accordance with the gradient of the road. In the example in FIG. 9, since the road is a downhill road, the stopping controller 15 causes the steered wheels 51 and 52 to be oriented toward the curb 60, and ends the automatic stop process.

If it is determined that it is impossible to make a lane change to the lane 75 on the curb 60 side in a predetermined time because a nearby vehicle 250 which prevents a lane change is present, the stopping controller 15 does not cause a lane change to be made, and causes the vehicle 1 to be pulled over to the object 64 on the median strip and be stopped. Then, similarly to the examples in FIGS. 6 and 7, the stopping controller 15 causes the orientation of the steered wheels 51 and 52 to be changed in accordance with the gradient of the road, and ends the automatic stop process. In the example in FIG. 9, since the road is a downhill road, the stopping controller 15 causes the steered wheels 51 and 52 to be oriented toward the object 64, and ends the automatic stop process.

Second Embodiment

Figure 10:
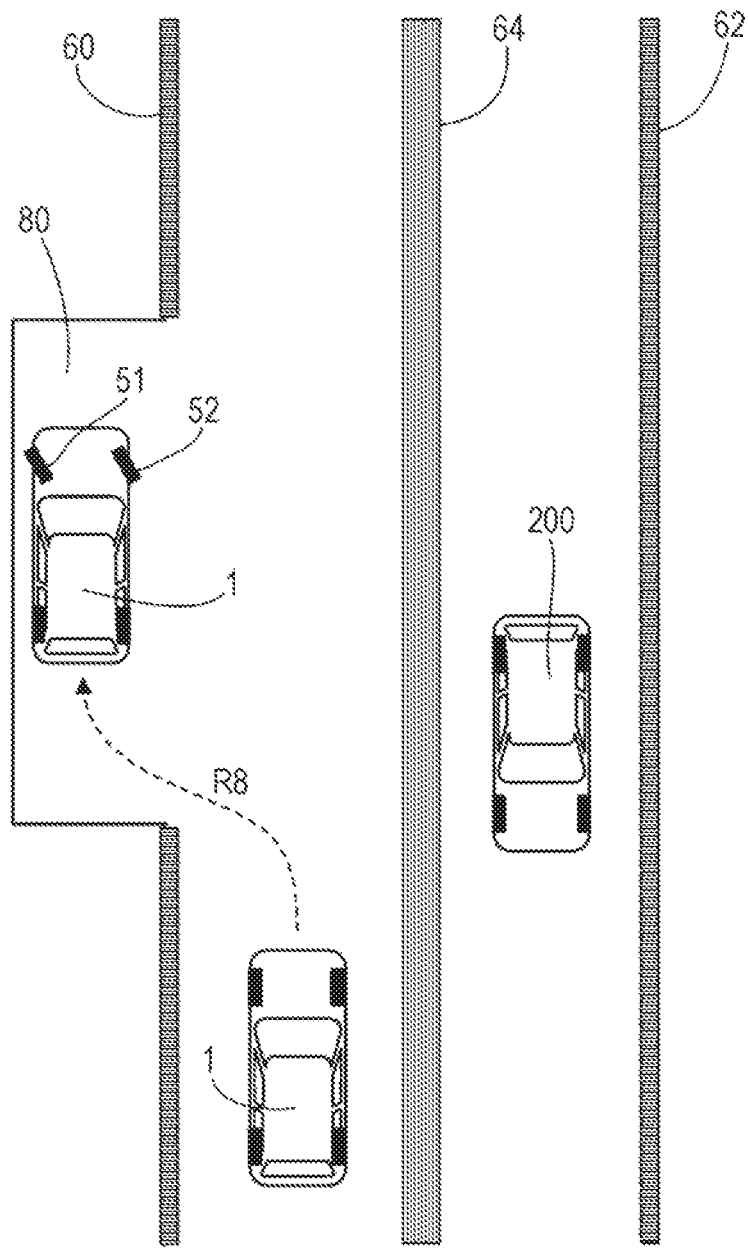
FIG. 10 is a diagram :for describing an automatic stop process performed when a stopping space is provided in an area other than traffic lanes.

Referring to FIG. 10, a second embodiment of the present disclosure will be described. The second embodiment employs an automatic stop process performed when the vehicle 1 is stopped in an available stopping area 80 (such as an emergency refuge area) provided in an area other than the road on which the vehicle 1 is travelling.

If the emergency stop condition is satisfied, when the road-condition determining unit 11 determines presence of the available stopping area 80 provided in an area other than the road (adjacent to the road, for example), the stopping controller 15 performs the automatic stop process in which the vehicle 1 is automatically stopped in the available stopping area 80.

The stopping controller 15 operates the steering mechanism 7 and the braking mechanism 8 so that the vehicle 1 is stopped in the available stopping area 80. Then, the stopping controller 15 causes the steered wheels 51 and 52 to be oriented away from the road, and ends the automatic stop process. Thus, the vehicle 1 is stopped with the steered wheels 51 and 52 oriented away from the road, whereby a state in which the; vehicle 1 moves toward the road may be avoided.

Third Embodiment

Figure 11:
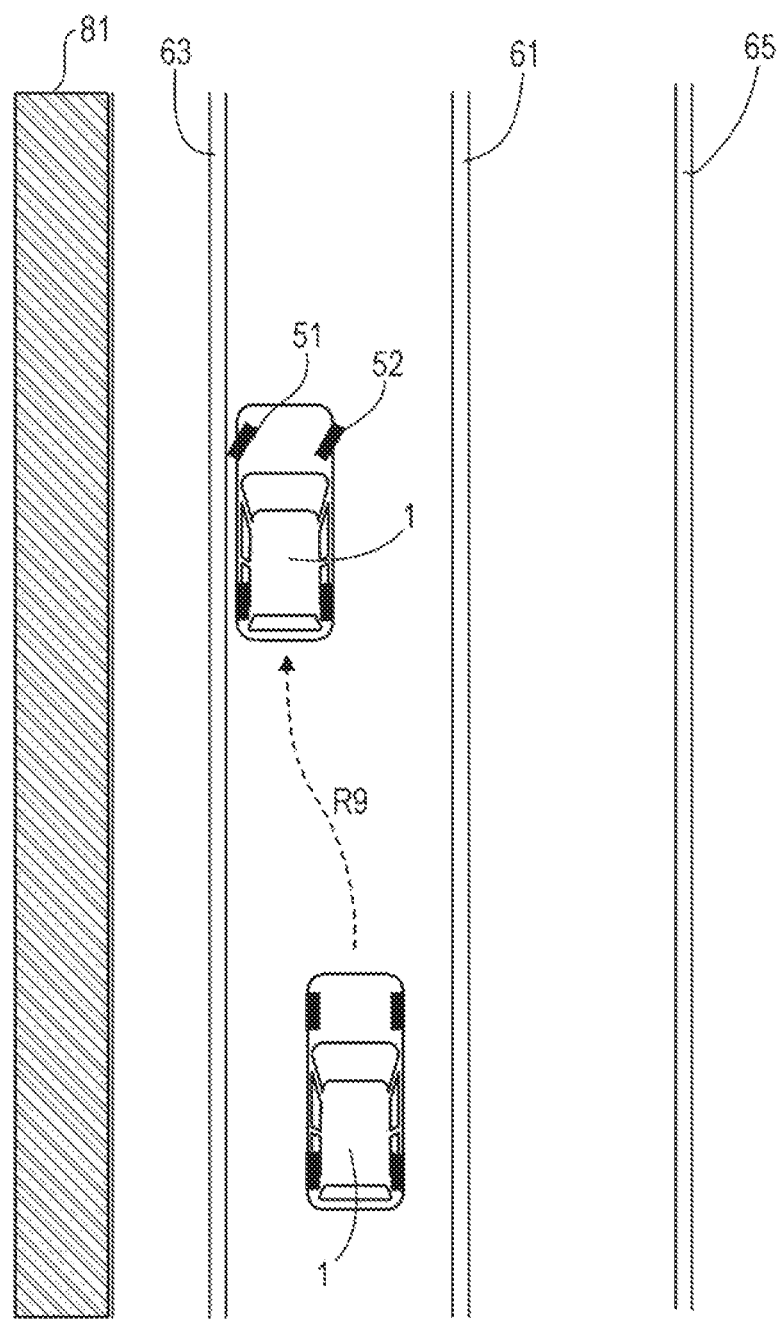
FIG. 11 is a diagram for describing an automatic stop process performed in the case where no curbs are present along the road edges and where a to-be-avoided area is present in an area outside a road edge.

Referring to FIG. 11, a third embodiment of the present, disclosure will be described. The third embodiment employs an automatic stop process performed in the case where the road on which the vehicle 1 is travelling is a road on which no curbs are present along the road edge 63 and on which no objects are present on the median strip 61, and where a to-be-avoided area 81 (such as a cliff or a gutter) is present beyond the road edge 63.

The stopping controller 15 operates the steering mechanism 7 and the braking mechanism 8 so that the vehicle 1 is pulled over to the road edge 63 and stopped. Then, the stopping controller 15 causes the steered wheels 51 and 52 to be oriented away from the road edge 63 and ends the automatic stop process. Thus, the vehicle 1 is stopped with the steered wheels 51 and 52 oriented away from the road edge 63, whereby a state in which the vehicle 1 moves toward the to-be-avoided area 81 may be avoided.

Modified Embodiment

In the first, to third embodiments, the vehicle 1 is stopped, and the: orientation of the steered wheels 51 and 52 is then changed in an automatic, stop process. Alternatively, the vehicle 1 may be stopped, with the orientation of the steered wheels 51 and 52 which has been changed. Instead, after the vehicle 1 is stopped parallel to the road, the orientation of the steered wheels 51 and 52 may be changed into a direction nonparallel to the road.

Figure 12:
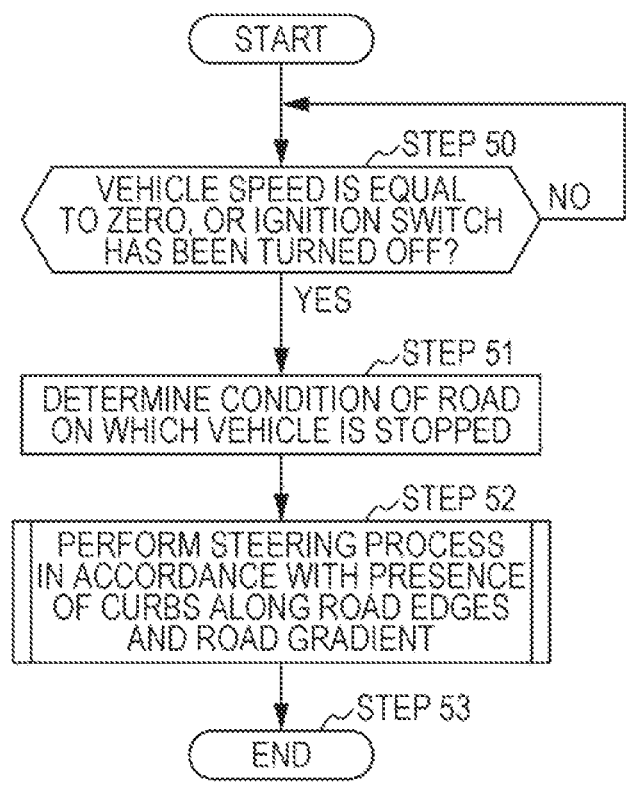
FIG. 12 is a flowchart of a steering process performed, when a vehicle is stopped through an operation performed by a driver in one embodiment.

When an operation performed by the driver, not an automatic stop process, causes the vehicle 1 to stop, the stopping controller 15 performs a process according to the flowchart in FIG. 12. In this case, after the vehicle 1 is stopped, the orientation of the steered wheels 51 and 52 may be also changed in according with the condition of the road.

In STEP 50 in FIG. 12, when the detection speed obtained from the vehicle speed sensor 20 is equal to zero, or when an ignition switch (not illustrated) has been turned off through an operation, the stopping controller 15 determines that the vehicle 1 has stopped, and the process proceeds to STEP 51.

In STEP 51 which is performed by the road-condition determining unit 11, a process similar to that in STEP 2 in FIG. 3 described above is performed to determine the conditions (the presence/absence of curbs along the road edges, and the gradient of the road, i.e., an uphill gradient or a downhill gradient) of the road (currently-vehicle-located road) on which, the vehicle 1 is stopped. The process in which the road-condition determining unit 11 determines the condition of the road may be performed before the vehicle 1 is stopped.

In STEP 52 which is the next step, the stopping controller 15 performs a process similar to that in STEP 4 in FIG. 3 described above, thereby operating the steering mechanism 7 to perform a process (upon-stopping steering-direction changing process) of changing the orientation of the steered wheels 51 and 52 of the vehicle 1 in accordance with the presence/absence of curbs on the road and the gradient of the road. Then, the process proceeds to STEP 53, and the process ends.

Thus, change of the orientation of the steered wheels 51 and 52 according to the presence/absence of curbs on the road and the gradient of the road after stopping of the vehicle is efficient especially when the vehicle is stopped in a specific area (such as Canada and California) in which the orientation of a steered wheel during stopping is regulated.

Therefore, the upon-stopping steering-direction changing process may be performed when the vehicle-position determining unit 13 determines that the region in which the vehicle 1 is located is included in such a specific area.

As a condition for determining that the vehicle 1 has stopped, in addition to the condition, "the detection speed obtained by the vehicle speed sensor 20 is equal to zero, or the ignition switch has been turned off through an operation", which is described in STEP 50 in FIG. 12, release of a door lock (not illustrated) of the vehicle 1, or detection of opening of a door of the vehicle 1 may be used. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims.

Various modifications apparent to one of ordinary skill in the art could be made without departing from the scope of the invention. The accompanying claims cover such modifications.

We claim:

1. A vehicle control apparatus controlling an operation of a vehicle provided with a steering unit and a braking unit, the steering unit changing a direction of a steered wheel, the braking unit braking a wheel, the apparatus comprising:
   a road-condition determining unit that determines a condition of a travelling road on which the vehicle is travelling; and
   a stopping controller that, when a predetermined condition is satisfied, performs an automatic stop process by operating the braking unit, to stop the vehicle and causes the steering unit to change the direction of the steered wheel of the vehicle in accordance with the condition of the travelling road determined by the road-condition determining unit, the changed direction of the steered wheel being maintained when the automatic stop process ends.

2. The vehicle control apparatus according to claim 1, wherein, when the road-condition determining unit determines that the travelling road is a downhill road on which a curb is present along a road edge, the stopping controller ends the automatic stop process in a state in which the steered wheel of the vehicle is directed toward the curb, and, when the road-condition determining unit determines that the travelling road is an uphill road on which the curb is present along the road edge, the stopping controller ends the: automatic stop process in a state in which the steered wheel of the vehicle is directed away from the curb.

3. The vehicle control apparatus according to claim 1, wherein, when the road-condition determining unit determines that the travelling road is a downhill road on which an object is present on a median strip, the stopping controller ends the automatic stop process in a state in which the steered wheel of the vehicle is directed toward the object, and, when the road-condition determining unit determines that the travelling road is an uphill road on which the object is present on the median strip, the stopping controller ends the automatic stop process in a state in which the steered wheel of the vehicle is directed away from the object.

4. The vehicle control apparatus according to claim 2, wherein, in the automatic stop process, when the road-condition determining unit determines that the travelling road is a road on which the curb is present along the road edge and on which a first object is present on a median strip, the stopping controller causes the vehicle to be pulled over to a closer one chosen from among the curb and the first object, the vehicle being located closer to the closer one than the other, and causes the vehicle to stop, and
   wherein, when the road-condition determining unit, determines that the travelling road, is a downhill road, the stopping controller ends the automatic stop process in a state in which the steered wheel of the vehicle is directed toward the closer one, and, when the road-condition determining unit determines that the travelling road is an uphill road, the stopping controller ends the automatic stop process in a state in which the steered wheel of the vehicle is directed away from the closer one.

5. The vehicle control apparatus according to claim 1, further comprising:
   a nearby-vehicle determining unit, that determines a condition about another vehicle which is present around the vehicle,
   wherein, when the predetermined condition is satisfied, if the road-condition determining unit, determines that the travelling road includes two lanes or more on each side, and is a road on which a curb is present along a road edge and on which an object is present on a median strip, and if the road-condition determining unit also determines that the vehicle is travelling In a lane closest to the median strip, the stopping controller determines whether or not a condition in which a lane change is allowed to be made without coming into contact with the other vehicle is satisfied on the basis of the condition about the other vehicle which is present nearby, the condition about the other vehicle being determined by the nearby-vehicle determining unit, the lane change being a lane change to a lane along which the curb is present,
   wherein, if the condition in which the lane change is allowed to be made is satisfied, the stopping controller causes the lane change to be made and then causes the vehicle to stop, and
   wherein, if the condition in which the lane change is allowed to be made is not satisfied in a predetermined length of time, the stopping controller does not cause the lane change to be made, and causes the vehicle to stop in the lane closest to the median strip.

6. The vehicle control apparatus according to claim 1, wherein, when the automatic stop process is performed to stop the vehicle in an available stopping area which is an area located outside the travelling road, the stopping controller ends the automatic stop process in a state in which the steered wheel of the vehicle is directed away from a center area of the travelling road.

7. The vehicle control apparatus according to: claim 1, wherein, when the road-condition determining unit determines that a to-be-avoided area is present alongside the travelling road, the stopping controller ends the automatic stop process in a state in which the steered wheel of the vehicle is directed away from the to-be-avoided area.

8. The vehicle control apparatus according to claim 1, wherein the road-condition determining unit determines the condition of the travelling road on the basis of at least one of a recognition result and a checking result, the recognition result being obtained by an external area recognition sensor equipped to the vehicle, the checking result being obtained by checking map information against a current position of the vehicle.

9. A vehicle control apparatus controlling an operation of a vehicle provided with a steering unit and a braking unit, the steering unit changing a direction of a steered wheel, the braking unit braking a wheel, the apparatus comprising:
   a road-condition determining unit that determines a condition of a travelling road on which the vehicle is travelling; and
   a stopping controller that, when a predetermined condition is satisfied, performs an automatic stop process of causing the steering unit and the braking unit to stop the vehicle parallel to the travelling road, and then causing the steering unit to change the direction of the steered wheel of the vehicle in a direction nonparallel to a forward direction of the travelling road in accordance with the condition of the travelling road determined by the road-condition determining unit.

10. A vehicle control apparatus controlling an operation of a vehicle provided with a steering unit that changes a direction of a steered wheel, the apparatus comprising:
- a road-condition determining unit that determines a condition of a currently-vehicle-located road which is a road on which the vehicle is located; and
- a stopping controller that, when the vehicle stops, if the road-condition determining unit determines that the currently-vehicle-located road is a road on which a curb is present along a road edge and which has a gradient, performs an upon-stopping steering-direction changing process of changing the direction of the steered wheel of the vehicle in accordance with the gradient of the currently-vehicle-located road.

11. The vehicle control apparatus according to claim 10, further comprising:
- a vehicle-position determining unit that determines a region in which the vehicle is located, wherein, when the vehicle-position determining unit determines that the vehicle is located in a specific area, the stopping controller performs the upon-stopping steering-direction changing process.

12. The vehicle control apparatus according to claim 1, wherein the stopping controller stops the vehicle and then changes the direction of the steered wheel of the vehicle.

13. The vehicle control apparatus according to claim 10, wherein the stopping controller detects whether the vehicle has stopped, and if so, performs the upon-stopping steering-direction changing process.

14. The vehicle control apparatus according to claim 11, wherein, when the vehicle-position determining unit determines that the vehicle is located outside the specific area, the stopping controller does not perform the upon-stopping steering-direction changing process.

* * * * *